Jan. 17, 1956  J. F. ALCOCK  2,731,256
RESILIENT POWER-TRANSMISSION WHEELS
Filed April 13, 1951

Inventor
J. F. Alcock

United States Patent Office 2,731,256
Patented Jan. 17, 1956

2,731,256
RESILIENT POWER-TRANSMISSION WHEELS

John Frederick Alcock, Leeds, England

Application April 13, 1951, Serial No. 220,743

Claims priority, application Great Britain December 29, 1950

2 Claims. (Cl. 267—1)

This invention relates to resilient power-transmission wheels and particularly spur-gear wheels, of the kind in which a peripheral portion is mounted with angular freedom of movement in a central portion, and in which the two portions are interconnected by tangentially arranged springs.

The object of the invention is to provide improved means for supporting the springs in position.

The invention comprises a pad having one side recessed for the reception of one end of a spring, and having its other side adapted to provide abutment surfaces for co-operating with the wheel portions, the said other side being also adapted to engage either of the wheel portions for preventing lateral displacement of the pad.

Figure 1:
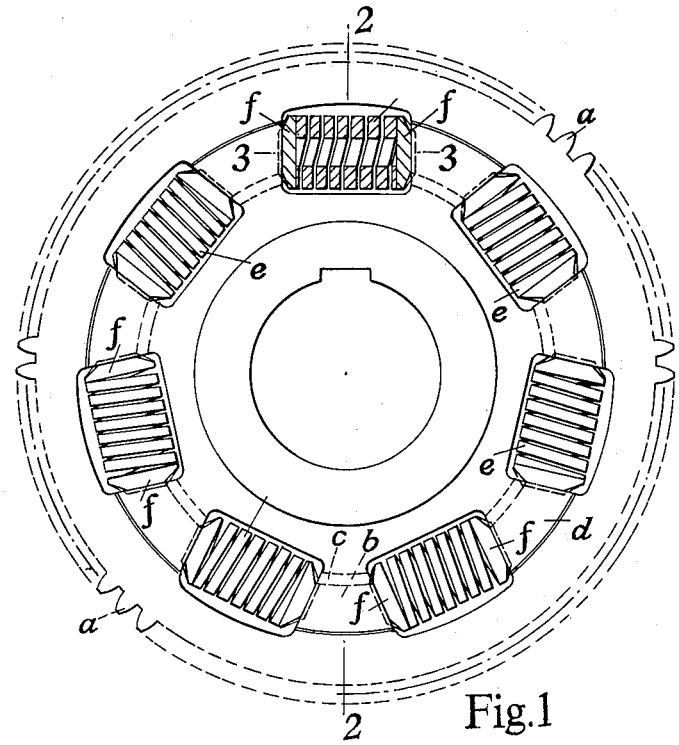
Figure 1 is a side elevation of a power transmission wheel of the kind specified, provided with spring-supporting pads in accordance with the invention
Figure 2:
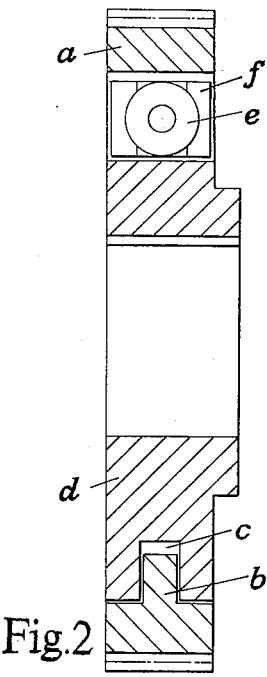
Figure 2 is a cross section on the line 2—2, Figure 1.

Referring to the drawings, the wheel there shown comprises an outer annular and toothed portion $a$ having around its inner periphery a central flange $b$ adapted to lie within a corresponding circumferential groove $c$ in the central portion $d$ of the wheel. Both portions are gapped at a number of circumferential positions (as shown in Figure 1) to enable the portions to be assembled. After assembly, springs $e$ of helical form are inserted in the gaps. The radial edges of the gaps in both portions lie on the same radii to form abutments which, upon relative rotation of the outer annular portion and of the central portion, will tend to compress the springs. These abutments are double acting since motion of the parts in either direction cause the abutments to act to compress the springs.

At each end each spring is provided with a metal pad $f$ and according to the example of the invention shown in the drawings, each pad (which is of rectangular shape) is formed at one side with a shallow circular recess $g$ for accommodating one end of the associated spring $e$.

The other side of each pad is substantially flat, and has formed on it a pair of narrow transverse ribs $h$ adapted to enter the adjacent end of the circumferential groove $c$ in the central portion of the wheel. These ribs are parallel with each other and are adapted to accommodate between them a complementary short tenon $i$ on the adjacent end of the flange $b$ of the outer wheel portion. The said side of the pad thus provides a pair of abutment surfaces $j$, $k$ for the adjacent ends of the gaps in the two wheel portions, and the ribs $h$ on the pad serve to prevent lateral displacement of the pad after assembly.

Figure 3:
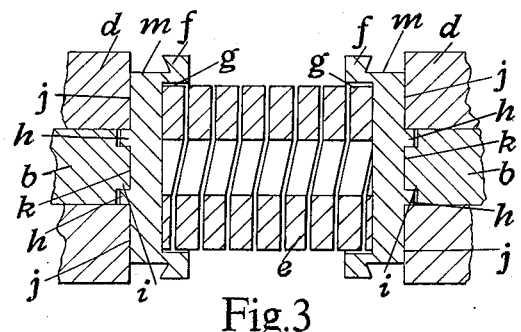
Figure 3 is a fragmentary sectional plan on the line 3—3, Figure 1 (and to a larger scale) showing the relative positions of the wheel parts, and one of the springs with its associated pads, under no-load, or light load condition.
Figure 4:
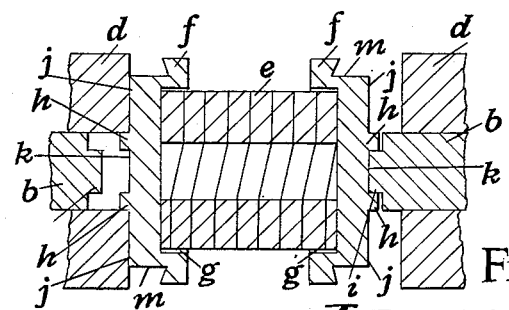
Figure 4 is a similar view to Figure 3, showing the wheel parts in a relatively displaced condition, such as occurs when the wheel is under a sufficient load to cause compression of the spring.

The arrangement is such that when the wheel is not under a torsional load each pad bears at one side against the adjacent ends of the gaps in the two wheel portions $b$, $d$ as shown in Figure 3. But when the wheel is under load, causing relative angular movement of the wheel portions (in either direction), the portion $b$ is separated from one of the pads, and the portion $d$ is separated from the other pad, as shown in Figure 4. At all times, however, the ribs $h$ prevent lateral displacement of the pads.

To facilitate the insertion in position of the assembly comprising a spring and a pair of pads, a step or rabbet $m$ is formed along each of a pair of opposite edges of the pad to accommodate a clamp by which the assembly can be held together (with the spring compressed). After insertion in position, the clamp is detached, leaving the spring free to expand and hold the pads in place.

By this invention, the securing of the springs in position is effected in a very simple and convenient manner. The invention is not, however, restricted to the example above described, as subordinate details of design may be modified to suit different requirements.

Having thus described my invention what I claim as new and desire to secure by Letters Patent is:

1. Means for supporting a helical compression spring, comprising the combination with the spring, and a pair of relatively movable members by which the spring is compressible, of a pair of similar supporting pads situated at opposite ends of the spring, one side of each pad being provided with a recess which accommodates the adjacent end of the spring, and the opposite side of each pad having thereon two parallel ribs which divide the last mentioned side into three substantially flat abutment surfaces, and through the medium of which the pad is supportable by both of the relatively movable members with a tenon-like part of one of the said members extending between the ribs and bearing against one of the abutment surfaces, and with the other of the said members housing the ribs and bearing against the other abutment surfaces, so that the ribs serve by co-operation with the adjacent parts of the said members to prevent lateral displacement of the pad irrespective of the relative positions occupied by the said members.

2. Means according to claim 1, in which each spring-supporting pad has stepped edges which are engageable by a clamp for holding the pads and spring together, with the spring compressed, when the spring is required to be inserted into or removed from its operative position.

References Cited in the file of this patent
UNITED STATES PATENTS

| 188,932 | Morris | Mar. 27, 1877 |
| 1,385,993 | Groff | Aug. 2, 1921 |
| 1,825,630 | Hamilton | Sept. 29, 1931 |
| 1,856,621 | Coffee | May 3, 1932 |
| 1,897,836 | Bristol | Feb. 14, 1933 |
| 2,127,996 | Havill | Aug. 23, 1938 |
| 2,316,820 | Thelander | Apr. 20, 1943 |
| 2,504,893 | Sisson | Apr. 18, 1950 |